United States Patent [19]
Klug et al.

[11] Patent Number: 5,236,782
[45] Date of Patent: Aug. 17, 1993

[54] MICROCAPSULES

[75] Inventors: Günter Klug, Monheim; Norbert Weimann; Josef Vogel, both of Leverkusen, all of Fed. Rep. of Germany

[73] Assignee: Bayer Aktiengesellschaft, Leverkusen, Fed. Rep. of Germany

[21] Appl. No.: 730,405

[22] Filed: Jul. 16, 1991

[30] Foreign Application Priority Data

Jul. 26, 1990 [DE] Fed. Rep. of Germany ....... 4023703

[51] Int. Cl.$^5$ .............................................. B01J 13/16
[52] U.S. Cl. .................................. 428/402.21; 264/4.7; 424/408; 424/497; 427/150; 503/215
[58] Field of Search ................. 264/4.7; 428/402.21; 424/408, 497

[56] References Cited

U.S. PATENT DOCUMENTS

| | | | |
|---|---|---|---|
| 4,120,518 | 10/1978 | Baatz et al. | 264/4.7 X |
| 4,193,889 | 3/1980 | Baatz et al. | 264/4.7 |
| 4,356,108 | 10/1982 | Schwab et al. | 264/4.7 |
| 4,778,781 | 10/1988 | Washizu et al. | 264/4.7 X |
| 4,942,107 | 7/1990 | Saeki et al. | 430/138 |
| 5,075,208 | 12/1991 | Watanabe et al. | 430/559 |
| 5,075,279 | 12/1991 | Sano | 264/4.7 X |

FOREIGN PATENT DOCUMENTS 50264 4/1982 European Pat. Off. .

*Primary Examiner*—Richard D. Lovering
*Attorney, Agent, or Firm*—Sprung Horn Kramer & Woods

[57] ABSTRACT

Microcapsules which can be prepared at low temperatures contain walls composed of the product of an interface polyaddition and/or interface polycondensation reaction between a hydroxylamine and at least one component which is reactive with amino and alcohol groups. These microcapsules are advantageously used in the production of carbonless copying paper and thermal paper.

4 Claims, No Drawings

MICROCAPSULES

The preparation of microcapsules by interfacial polyaddition and interfacial polycondensation is described in general by P. C. Madau in Drug Development and Industrial Pharmacy 4, 289 to 304 (1978). In particular, the preparation of microcapsules by interfacial polyaddition between polyisocyanates and polyamines is described, for example, in German Offenlegungsschriften 2,109,335, 2,251,381, 2,242,910, 2,120,921 and 3,020,148.

If water-soluble polyamines are employed in this process, elevated temperatures are required for the production of impervious capsules having firm capsule walls and for the complete reaction of the polyisocyanates, which are generally dissolved in the organic phase. For example, the micro-encapsulation is completed in such cases at temperatures from 50° up to 80° C. A disadvantage of this is that a reaction of water with polyisocyanate then results to an increased extent. The carbon dioxide which forms during this reaction causes an increased tendency of the capsules to agglomerate and a high degree of foam formation and can lead to the destruction of the capsules. If reactive components other than polyisocyanates are used, for example in the case of acid chlorides and similar compounds, the reactive components are hydrolysed by water at an elevated temperature and are then no longer available for the formation of capsule walls.

Microcapsules have now been found which are characterised in that their walls contain the product of an interfacial polyaddition and/or interfacial polycondensation reaction between a hydroxylamine and at least one component which is reactive with amino and alcohol groups. The walls of microcapsules according to the invention preferably consist of this reaction product.

The hydroxylamine can, for example, correspond to the formula (I)

$$R-NH-OH \quad (I)$$

in which

R represents hydrogen, $C_1$ to $C_{12}$-alkyl, $C_6$ to $C_{10}$-aryl, $C_7$ to $C_{12}$-aralkyl or $C_7$ to $C_{12}$-alkaryl.

The alkyl radicals and the alkyl moieties of the aralkyl and alkaryl radicals can be linear or branched.

Preferred hydroxylamines are those of the formula (I) in which R represents hydrogen, $C_1$ to $C_{12}$-alkyl or phenyl. Unsubstituted hydroxylamine (formula (I), R=hydrogen) is particularly preferred.

The hydroxylamines can also be employed in the form of their salts, for example in the form of salts of the formula (II)

$$[R-\overset{\oplus}{NH_2}-OH]_n X^{n\ominus} \quad (II)$$

in which

R has the meaning indicated for formula (I),

X represents an anion and n represents the valency of X.

$X^{n\ominus}$ can, for example, represent $Cl^{31}$, $HCO_3^-$, $CO_3^{2-}$, $Br^-$, $I^-$, $SO_4^{2-}$, $NO_3^-$, $PO_4^{3-}$ or $SiO_4^{4-}$.

The reactive hydroxylamines of the formula (I) can be liberated from the salts of the formula (II) by addition of bases. Examples of suitable bases are alkali metal and alkaline earth metal hydroxides, in particular potassium, sodium and calcium hydroxide, which are preferably employed as an aqueous solution.

The following may be mentioned as examples of components which are reactive with amino and alcohol groups:

Dicarboxylic and polycarboxylic acid chlorides, such as sebacoyl chloride, terephthaloyl chloride, adipoyl dichloride, oxaloyl dichloride, tricarballyloyl trichloride and 1,2,4,5-benzenetetracarboxylic acid tetrachloride, disulphonyl and polysulphonyl chlorides, such as 1,3-benzenedisulphonyl chloride and 1,3,5-benzenetrisulphonyl chloride, phosgene, bis-chloroformic and polychloroformic acid esters, such as 1,3,5-phenyl trischloroformate and ethylene bis-chloroformate and, preferably, diisocyanates and polyisocyanates, such as aliphatic, cycloaliphatic, araliphatic, aromatic and heterocyclic diisocyanates and polyisocyanates, such as are described, for example, by W. Siefken in Justus Liebigs Annalen der Chemie, 562, pages 75 to 136, for example ethylene diisocyanate, 1,4-tetramethylene diisocyanate, 1,6-hexamethylene diisocyanate, 1,12-dodecane diisocyanate, 1,3-cyclobutane diisocyanate, 1,3-cyclohexane diisocyanate and 1,4-cyclohexane diisocyanate and any desired mixtures of these isomers, 1-isocyanato-3,3,5-trimethyl-5-isocyanatomethyl-cyclohexane such as described for example in German Auslegeschrift 1,202,785 and U.S. Pat. No. 3,401,190), 2,4-hexahydrotoluylene diisocyanate and 2,6-hexahydrotoluylene diisocyanate and any desired mixtures of these isomers, hexahydro-1,3-phenylene diisocyanate and hexahydro-1,4-phenylene diisocyanate, perhydro-1,4'-diphenylmethane diisocyanate and perhydro-4,4'-diphenylmethane diisocyanate, 1,3-phenylene diisocyanate and 1,4-phenylene diisocyanate, 2,4-toluylene diisocyanate and 2,6-toluylene diisocyanate and any desired mixtures of these isomers, diphenylmethane 2,4'-diisocyanate and diphenylmethane 4,4,-diisocyanate, 1,5-naphthylene diisocyanate, triphenylmethane 4,4',4''-triisocyanate, polyphenylpolymethylene polyisocyanates, such as are obtained by aniline-formaldehyde condensation and subsequent phosgenation and described, for example, in British Patent Specifications 874,430 and 848,671, m-isocyanatophenylsulphonyl isocyanates and p-isocyanatophenylsulphonyl isocyanates according to U.S. Pat. No. 3,454,606, perchlorinated aryl polyisocyanates, such as are described, for example, in German Auslegeschrift 1,157,601 (=U.S. Pat. No. 3,277,138), polyisocyanates containing carbodiimide groups, such as are described in German Patent Specification 1,092,007 (=U.S. Pat. No. 3,152,162) diisocyanates such as are described in U.S. Pat. No. 3,492,330, polyisocyanates containing allophanate groups, such as are described, for example, in British Patent Specification 761,626 and the published Dutch Patent Application 7,102,524, polyisocyanates containing isocyanurate groups, such as are described, for example, in U.S. Pat. No. 3,001,973, in German Patent Specifications 1,022,789, 1,222,067 and 1,027,394 and also in German Offenlegungsschriften 1,929,034 and 2,004,048, polyisocyanates containing urethane groups, such as are described, for example, in Belgian Patent Specification 752,261 or in U.S. Pat. No. 3,394,164, polyisocyanates containing acylated urea groups according to German Patent Specification 1,230,778, polyisocyanates containing biuret groups, such as are described, for example, in German Patent Specification 1,101,394 (=U.S. Pat. No. 3,124,605 and 3,201,372) and also in British Patent Specification 889,050, polyisocyanates prepared by telomerisation reactions, such as are described, for example, in U.S. Pat. No. 3,654,106, polyisocyanates containing ether groups, such as are mentioned in British Patent Specifications 965,474 and 1,072,956, in U.S. Pat. No. 3,567,763 and in German Patent Specification 1,231,688, reaction products of the abovementioned isocyanates with acetals according to German Patent Specification 1,072,385 and polyisocyanates containing polymeric fatty acid radicals according to U.S. Pat. No. 3,455,883.

It is also possible to employ the distillation residues containing isocyanate groups, formed during the industrial preparation of isocyanates, if appropriate dissolved in one or more of the abovementioned polyisocyanates. It is also possible to use any desired mixtures of the abovementioned polyisocyanates.

Examples of suitable modified, aliphatic isocyanates are those based on 1,6-hexamethylene diisocyanate, m-xylylene diisocyanate, 4,4'-diisocyanatodicyclohexylmethane and isophorone diisocyanate which contain at least two isocyanate groups per molecule.

Examples of other suitable compounds are polyisocyanates based on derivatives of 1,6-hexamethylene diisocyanate having a biuret structure, as described in German Auslegeschrift 1,101,394, German Auslegeschrift 1,453,543, German Offenlegungsschrift 1,568,017 and German Offenlegungsschrift 1,931,055.

In addition, it is possible to employ polyisocyanatopolyuretoneimines, such as are formed by the carbodiimidisation of 1,6-hexamethylene diisocyanate containing biuret groups with organophosphorus catalysts, carbodiimide groups initially formed reacting with further isocyanate groups to give uretoneimine groups.

It is also possible to use isocyanurate-modified polyisocyanates containing more than two terminal isocyanate groups, for example those whose preparation based on hexamethylene diisocyanate is described in German Offenlegungsschrift 2,839,133. Other isocyanurate-modified polyisocyanates can be obtained analogously thereto. Isocyanates of the formula

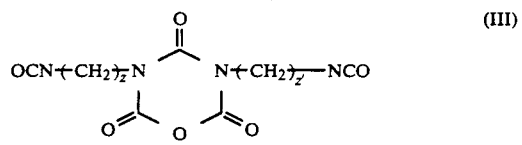

(III)

in which z and z' independently of one another each represent an integer from 3 to 6, which can, for example, be prepared in accordance with Examples 1a or 4a of U.S. Pat. No. 4,253,682 or analogously thereto, are also suitable.

It is also possible to use mixtures of the stated isocyanates, for example mixtures of aliphatic isocyanates, mixtures of aromatic isocyanates, mixtures of aliphatic and aromatic isocyanates and especially mixtures which contain optionally modified diphenylmethane diisocyanates.

Preferred isocyanates are biuretic hexamethylene diisocyanate, if appropriate mixed with 4,4'-diphenylmethane isocyanate and, if appropriate, 2,4-diphenylmethane isocyanate, trimerised hexamethylene diisocyanate, if appropriate mixed with 4,4'-diphenylmethane diisocyanate and, if appropriate, 2,4-diphenylmethane diisocyanate and isocyanates of the formula (III).

Other preferred diisocyanates are the alkylbenzene diisocyanates and alkoxybenzene diisocyanates indicated in German Offenlegungsschriften 3,105,776 and 3,521,126, also in the form of their biuret-isocyanateuretdione oligomers.

The substances described here which are reactive with amino and/or alcohol groups, can also be used as mixtures with one another. Furthermore the substances or mixtures of substances which are reactive with amino and alcohol groups, described here, can also be used in the form of their prepolymers. Isocyanates of the formula (III), derivatives of 1,6-hexamethylene diisocyanate having a biuret structure and isocyanurate-modified polyisocyanates are of particular interest.

Examples of a suitable core material for encapsulation into the microcapsules according to the invention are any hydrophobic liquids which are sparingly miscible with water, for example aliphatic and aromatic hydrocarbons, halogenated hydrocarbons, ethers, esters and natural fats and oils which contain no groups which react with the wall-forming components. Suitable core materials are also solids, for example active compounds, pharmaceuticals, pesticides and herbicides, which can be encapsulated in solution or in a solid form.

Recording materials containing microcapsules according to the invention are of particular importance. Recording materials are to be understood here as meaning, in particular, materials on which visible images can be produced by imagewise mechanical pressure or by imagewise heating. Carbonless copying paper may be mentioned as an example (see M. Gutcho, Capsule Technology and Microencapsulation, Noyes Data Corporation, 1972, pages 242 to 277; G. Baxter, Microencapsulation, Processes and Applications, edited by J. E. Vandegaer, Plenum Press, New York-London, pages 127 to 143).

Carbonless copying paper can, for example, consist of two or more sheets of paper laid one on top of the other, the upper sheet in each case containing on its reverse side a donor layer and the lower sheet in each case having a receptor layer on its front side. Thus in each case a donor layer and a receptor layer are in contact with one another. The donor layer contains microcapsules the core material of which is a solution of a colour-former in an organic solvent. The receptor layer contains a colour developer, that is to say a material which converts the colour-former into a dyestuff. A duplicated copy is formed when the microcapsules are ruptured by the pressure of a writing instrument and the colour-former reacts with the colour developer.

If the microcapsules are applied to a paper together with a binding agent and a developer and thereafter the paper is heated imagewise then there is formed a visible image which corresponds to the imagewise heating. This is then a thermoreactive recording system.

The microcapsules containing colour-former and the colour developer can also be applied to the same side of a sheet of paper. This is then a "self-contained paper". A visible image can be produced on such material by imagewise pressure or imagewise heating.

The microcapsules of the present invention can contain, for example, as colour-formers those leuco-dyestuffs which are customary for pressure-sensitive and heat. sensitive recording materials. Preferred types of leuco-dyestuffs are derivatives of triphenylmethane, fluorane, phenothiazine, auramine, spiropyrane, indolinophthalide and oxazine which can be applied as individuals or in combinations of different individuals. Examples of such leuco-dyestuffs are: 3,3-bis-(p-dimethylaminophenyl)-phthalide, 3,3-bis-(p-dimethylaminophenyl)-6-dimethylaminophthalide (=crystal violet lactone), 3,3-bis-(p-dimethylaminophenyl)-6-diethylaminophthalide, 3,3-bis-(p-dimethylaminophenyl)-6-chlorophthalide, 3,3-bis-(p-dibutylaminophenyl)-phthalide, 3-cyclohexylamino-6-chlorofluorane, 3-dimethylamino-5,7-dimethylfluorane, 3-dimethylamino-7-chlorofluorane, 3-diethylamino-7-methylfluorane, 3-ethylamino-7,8-benzfluorane, 3-diethylamino-6-methyl-7-chlorofluorane, 3-(N-p-tolyl-N-ethylamino)-6-methyl-7-anilinofluorane, 3-pyrrolidino-6-methyl-7-anilinofluorane, 2-[N-(3'-trisfluormethylphenyl)-amino]-6-diethylaminofluorane, 2-[3,6-bis-(diethylamino)-9-(o-chloroanilino)-xanthylbenzoic acid lactam], 3-diethylamino-6-methyl-7-(m-trichloromethylaniline)-fluorane, 3-diethylamino-7-(o-chloroanilino)-fluorane, 3-dibutylamino-7-(o-chloroanilino)-fluorane, 3-N-methyl-N-amylamino-6-methyl-7-anilinofluorane, 3-N-methyl-N-cyclohexylamino-6-methyl-7-anilinofluorane, 3-diethylamino-6-methyl-7-anilinofluorane, 3-(N,N-diethylamino)-5-methyl-7-(N,N-dibenzylamino)-fluorane, benzoyl-leucomethyleneblue, 6,-chloro-8,-methoxy-benzoindolino-spiropyrane, 6,-bromo-3'-methoxy-benzoindolino-spiropyrane, 3-(2,-hydroxy-4,-dimethylaminophenyl)-3-(2,-methoxy-5'-chlorophenyl)-phthalide, 3-(2'-hydroxy-4'-dimethylaminophenyl)-3-(2'-methoxy-5'-nitrophenyl)-phthalide, 2-(2'-hydroxy-4'-diethylaminophenyl)-3-(2'-methoxy-5'-methylphenyl)-phthalide, 3-(2'-methoxy-4'-dimethylaminophenyl)-3-(2'-hydroxy-4'-chloro-5'-methylphenyl)-phthalide, 3-(N-ethyl-N-tetrahydrofurfuryl)-amino-6-methyl-7-anilinofluorane, 3-N-ethyl-N-(2-ethoxypropyl)-amino-6-methyl-7-anilinofluorane, 3-(N-methyl-N-isopropyl)-amino-6-methyl-7-anilinofluorane, 3-morpholino-7-(N-propyl-trifluormethylanilino)-fluorane, 3-pyrrolidino-7-trifluormethylanilinofluorane, 3-diethylamino-5-chloro-7-(N-benzyl-trifluoromethylanilino)-fluorane, 3-pyrrolidino-7-(di-p-chlorophenyl)-methylaminofluorane, 3-diethylamino-5-chloro-7-(α-phenylethylamino)-fluorane, 3-(N-ethyl-p-toluidino)-7-(o-phenylethylamino)-fluorane, 3-diethylamino-7-(α-methoxycarbonyl-phenylamino)-fluorane, 3-diethylamino-5-methyl-7-(α-phenylethylamino)-fluorane, 3-diethylamino-7-piperidinofluorane, 2-chloro- 3-(N-methyltoluidino)-7-(p-n-butylanilino)-fluorane, 3-dibutylamino-3-methyl-7-anilinofluorane, 3,6-bis-(dimethylamino)-fluorenspiro(9,3,)-6-dimethylaminophthalide, 3-(N-benzyl-N-cyclohexylamino)-5,6-benzo-7-naphthylamino-4'-bromofluorane, 3-diethylamino-6-chloro-7-anilinofluorane, 3-diethylamino-6-methyl-7-mesidino-4',5'-benzofluorane, 3-N-methyl-N-isopropyl-6-methyl-7-anilinofluorane, 3-N-ethyl-N-amyl-6-methyl-7-anilinofluorane, 3-diethylamino-6-methyl-7-(2',4'-dimethylanilino)-fluorane, 3-phenyl-4-(4-diethylaminophenyl)-4-(4-methoxyphenyl)-6-methyl-7-dimethylamino-4H-benzo-3.1-oxazine and isomers thereof, and 2-phenyl-4-(4-diethylaminophenyl)-4-phenyl-6-methyl-7-dimethylamino-4H-benzo-3.1-oxazine.

Examples of solvents for colour-formers are the following: chlorinated biphenyl, chlorinated paraffin, natural oils, such as cottonseed oil and groundnut oil, silicone oil, tricresyl phosphate, monochlorobenzene, partially hydrogenated terphenyls, alkylated biphenyls, alkylated naphthalenes, aryl ethers, arylalkyl ethers, polyalkylbenzenes and mixtures of these compounds. The solvents can also be employed together with diluents. Examples of diluents are kerosines, n-paraffins, isoparaffins and naphthenes.

Microcapsules according to the invention can be prepared, for example, by dissolving the component which is reactive with amino and alcohol groups in the hydrophobic core material to be encapsulated and emulsifying this organic phase in a continuous aqueous phase. The aqueous phase can, if appropriate, contain protective colloids and/or emulsifiers.

A base and an aqueous solution of a hydroxylammonium salt can then be added to an emulsion of this type. It is possible to add first a base and then a hydroxylammonium salt solution to an emulsion of this type or, conversely, to add the base and the hydroxylammonium salt solution simultaneously to the emulsion.

The interfacial polyaddition or polycondensation then proceeds by the hydroxylamine present in the aqueous phase reacting with the component which is reactive with amino and alcohol groups and which is present in the organic, disperse phase, with the formation of walls, consisting of polyaddition or polycondensation products, around the droplets of the organic phase.

This interfacial reaction can, for example, proceed at temperatures within the range of $-3°$ to $+50°$ C., but is preferably carried out at $0°$ to $25°$ C. and particularly preferably at $20°$ to $25°$ C.

The hydroxylamine or the hydroxylammonium salt can, for example, be employed in an amount corresponding to 20 to 500 % by weight of the amount required for a stoichiometric reaction with the component which is reactive with amino and alcohol groups. This proportion is preferably 50 to 400 % by weight, particularly preferably 80 to 200 % by weight.

In order to emulsify and stabilise the emulsion it is advantageous to add protective colloids and/or emulsifiers. Examples of protective colloids are carboxymethylcellulose, gelatine and polyvinyl alcohol; examples of emulsifiers are oxyethylated 3-benzylhydroxybiphenyl, reaction products of nonylphenol with ethylene oxide, fatty acid esters of sorbitan, polyvinylpyrrolidones and monomeric or oligomeric sulphonates.

Microcapsules according to the invention can be prepared continuously or batchwise. It is possible to use any desired dispersing equipment which produces a shear gradient, for example paddle agitators, cyclone impellers, impellers, colloid mills, homogenisers, ultrasonic dispersers, jets, supply-pressure jets and Supraton machines. The intensity of the turbulence during mixing is the primary factor determining the diameter of the microcapsules subsequently obtained. The diameter of the capsules can, for example, be within the range from 1 to 2000 μm. Capsules having diameters of 2 to 20 μm are preferred.

After the encapsulation a relatively highly concentrated suspension of microcapsules is generally present in the aqueous phase. This suspension, if appropriate after a short after-treatment, for example stirring at elevated temperature, can be used directly for the particular purpose envisaged.

The suspension can, for example, be converted by spray drying into a capsule powder free from agglomerates.

Suspensions containing micro-encapsulated colour-formers can be used, for example, for the preparation of carbonless copying paper and thermal paper. For this purpose it is possible, for example, to add binders and spacers to such a suspension and then to apply it to a paper carrier web. The formulation of coating compositions of this type and their application to paper is known per se. Microcapsules according to the invention can be used advantageously in the form of highly concentrated coating compositions and in this case the drying of the coating compositions can be carried out more efficiently. Coating can also be carried out with knife coaters or by means of engraving rollers, which permits a more rapid application of the coating composition than, for example, coating by means of air knife coaters.

It is also possible to use suspensions containing microcapsules according to the invention directly and without laborious concentration for the preparation of aqueous flexographic printing pastes.

Colour developers which are known per se, such as acid clays, montmorillonite, bentonites, smectites and synthetic phenolic or salicylate resins, can be employed as colour developers for colour-formers encapsulated in microcapsules according to the invention.

The capsules according to the invention have the advantage that they can be prepared at lower temperatures than hitherto, impervious capsules being nevertheless obtained and the reactive components reacting virtually completely.

Specific embodiments of the present invention are contained in the following examples.

EXAMPLES

Example 1

132.2 g of chloroparaffin (Meflex ® DA 029 from ICI) and 198.4 g of dodecylbenzene were mixed and 17.4 g of a colour-former mixture for a black colour, which contained 14 % by weight of Pergascript ® Grün I-GD 14% by weight of Pergascript ® Orange I-5R, 17.4% by weight of Pergascript ® Blau SRB, 26% by weight of Pergascript ® Blau I-2R (C.V.L.) (all from Ciba-Geigy) and 28.2% by weight of Reaktgelb ® 186 (from BASF) were dissolved in this mixture with stirring and heating to 90° C. 52 g of an oxadiazinetrione of hexamethylene diisocyanate (NCO content 20.5%) were added to this solution. The mixture thus obtained, together with 484 g of a 0.5% strength aqueous solution containing partially saponified polyvinyl acetate, was emulsified with a rotor-stator emulsifier until a droplet size of 8 μm had been reached. 116 g of a 9% strength aqueous solution of hydroxylammonium sulphate were added to this emulsion with stirring at room temperature, the pH was subsequently adjusted to a value of 7.5 by adding 170 g of an aqueous 1N NaOH solution in the course of 20 minutes, and the mixture was stirred at room temperature for a further 24 hours. A dispersion containing 34% of microcapsules was obtained.

This dispersion was applied to a commercially available base paper in an amount of 3 g of capsules per m² using a 40 μm wire bar, and was dried. The sheet of paper thus coated was then laid with its coated side resting on a second sheet of paper, the surface of which had been coated with a colour developer (commercially available CF paper). On duplicating, an intensely black copy was obtained.

Example 2

The procedure of Example 1 was followed, except that 484 g of a 0.7% strength aqueous solution containing partially hydrolysed polyvinyl acetate and 127.3 g of the 1N NaOH solution were employed. A dispersion containing 35.5% of microcapsules was obtained.

The impermeability of the microcapsules thus obtained was tested as follows: 5.63 g of the dispersion, containing 2 g of microcapsules, 8.6 g of distilled water and 13.3 g of a 300/30 silicasol from Bayer AG, were mixed, and 5 ml of this mixture were coated onto a base paper measuring 21×29 cm by means of a 30 μm wire bar, and were then dried. Immediately afterwards the reflectance of the paper was measured by means of an instrument of the Elrepho type (Karl Zeiss) and the absorption value was calculated from this by means of the following equation:

$$\text{Percentage absorption} = \frac{\text{Reflectance (base paper) minus Reflectance (sample)}}{\text{Reflectance (base paper)}} \times 100$$

The capsules are the more impervious the lower the absorption value thus determined.

The absorption value was 1.8%.

Example 3 (Comparison Example)

The procedure followed was as in Example 2, but 97.2 g of a 9% strength aqueous solution of diethylenetriamine were employed instead of 116 g of a 9% strength aqueous solution of hydroxylammonium sulphate, and no sodium hydroxide solution was added. After stirring at room temperature for 24 hours a 40% strength dispersion of microcapsules was obtained.

An impermeability test carried out as described in Example 2 gave an absorption value of 20.8%.

Example 4 (Comparison Example)

The procedure followed was as in Example 3, but 84.9 g of a 9% strength aqueous solution of ethylenediamine were used instead of the diethylenetriamine solution.

The impermeability test carried out as described in Example 2 gave an absorption value of 12.4%.

Example 5

52 g of a biuretised hexamethylene diisocyanate (NCO content 23.0%) were added to the same colour-former solution as in Example 1. This mixture, together with 475.9 g of a 0.7% strength aqueous solution containing partially saponified polyvinyl acetate, was emulsified as described in greater detail in Example 1. 124.1 g of a 9% strength aqueous solution of hydroxylammonium sulphate were added to this mixture at room temperature, with stirring. The pH of the dispersion was then brought to a value of 7.5 by means of 136 g of an aqueous 1N sodium hydroxide solution in the course of 20 minutes, and the mixture was stirred for a further 30 hours at room temperature. A 35.2% strength dispersion of microcapsules was obtained. No further free isocyanate could then be detected by IR spectroscopy.

Example 6 (Comparison Example)

The procedure followed was as in Example 5, but 103.9 g of a 9% strength aqueous solution of diethylenetriamine were employed instead of the hydroxylammonium sulphate solution, and no sodium hydroxide was added. After 30 hours, free isocyanate could still be detected in the resulting dispersion of microcapsules by IR spectroscopy. Only after stirring for a total of 820 hours was it no longer possible to detect free isocyanate by IR spectroscopy.

Example 7 (Comparison Example)

The procedure followed was as in Example 6, but 90.8 g of a 9% strength aqueous solution of ethylenediamine were employed instead of the diethylenetriamine solution.

Free isocyanate could still be detected by IR spectroscopy after stirring for 30 hours at room temperature. Only after stirring for a total of 506 hours was it no longer possible to detect free isocyanate by IR spectroscopy.

Example 8

13 g of sebacoyl chloride were dissolved in 87 g of a colour-former solution prepared as in Example 1. This solution, together with 855 g of a 0.7% strength aqueous solution containing partially hydrolysed polyvinyl acetate, was emulsified by means of a rotor-stator system, with cooling by means of an ice bath. 45.1 g of a 20% strength aqueous solution of hydroxylammonium sulphate were added during the emulsification, and the pH was adjusted to a value of 7.5 with 1N NaOH solution, with stirring at room temperature, and the mixture was stirred for a further 24 hours at room temperature. A 10% strength dispersion of microcapsules was thus obtained, which was applied to a commercially available base paper as described in Example 1. Duplication onto a commercially available CF paper gave an intensely black copy.

What is claimed is:

1. Microcapsules the walls of which contain the product of an interfacial polyaddition and/or interfacial polycondensation reaction between a hydroxylamine corresponding to the formula (I)

$$R-NH-OH \qquad (I)$$

in which

R represents hydrogen, $C_1$ to $C_{12}$-alkyl, $C_6$ to $C_{10}$-aryl, $C_7$ to $C_{12}$-aralkyl or $C_7$ to $C_{12}$-alkaryl and at least one component which is reactive with amino and alcohol groups.

2. The microcapsules of claim 1, in which the hydroxylamine has been employed in the form of a salt of the formula (II)

in which

R has the meaning indicated for formula (I),
X represents an anion and
n represents the valency of X.

$X^{n\ominus}$ can, for example, represent $Cl^-$, $HCO_3^-$, $CO_3^{2-}$, $Br^-$, $I^-$, $SO_4^{2-}$, $NO_3^-$, $PO_4^{3-}$ or $SiO_4^{4-}$.

3. The microcapsules of claim 1, in which the components which are reactive with amino and alcohol groups are dicarboxylic acid chlorides, polycarboxylic acid chlorides, disulphonyl chlorides, polysulphonyl chlorides, dichloroformic acid esters, polychloroformic acid esters, diisocyanates and/or polyisocyanates.

4. The microcapsules of claim 1, in which the component which is reactive with amino and alcohol groups is an isocyanate of the formula (III)

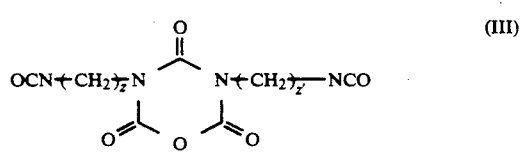

in which z and z' independently of one another each represent an integer from 3 to 6, and/or a derivative of 1,6-hexamethylene diisocyanate having a biuret structure and/or an isocyanurate-modified polyisocyanate.

* * * * *